May 7, 1940. W. T. LEGG 2,200,183
FISHING ROD HOLDER
Filed April 19, 1939
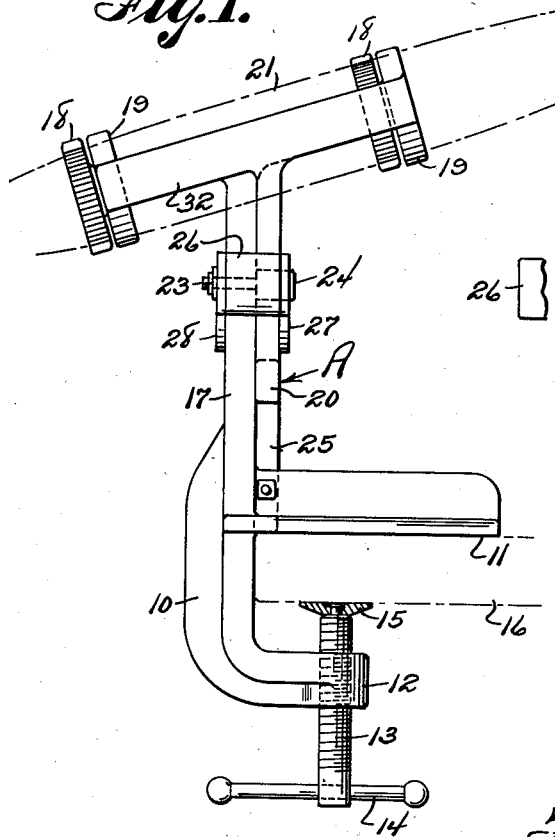
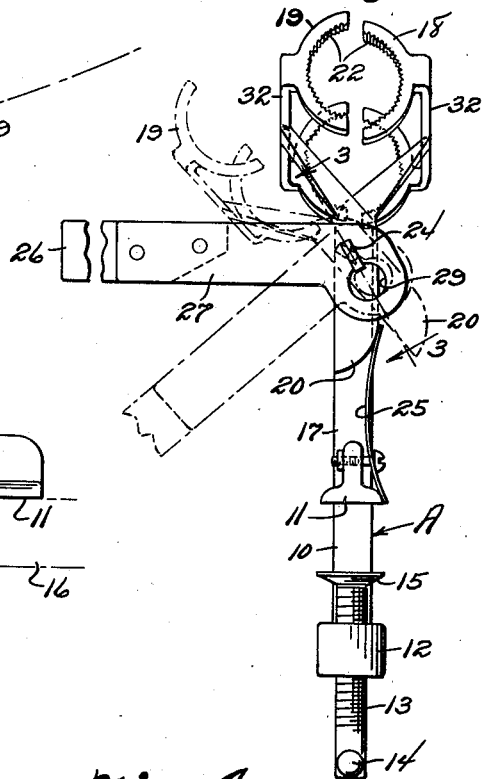
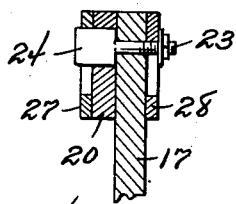
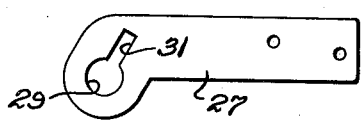
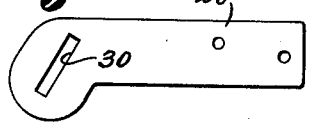
Walter T. Legg INVENTOR
BY Victor J. Evans & Co.
ATTORNEYS Patented May 7, 1940

2,200,183

UNITED STATES PATENT OFFICE 2,200,183

FISHING ROD HOLDER

Walter T. Legg, Electric Mills, Miss.

Application April 19, 1939, Serial No. 268,836

2 Claims. (Cl. 248—42)

The invention relates to a fishing rod holder and more especially to a casting rod holder for trolling.

The primary object of the invention is the provision of a holder of this character, wherein a fishing rod or pole can be held so that it can be quickly detached when necessary so that such rod or pole can be hand held and manipulated after indication of a bite when such rod or pole is within the holder and in this manner relieving a fisherman of the duty of holding the rod or pole by hand within a boat while trolling.

Another object of the invention is the provision of a holder of this character, wherein the same can be fastened within a boat so that a casting pole or rod for fishing purposes can be conveniently held for trolling and such rod or pole released for hand manipulation with dispatch from such holder and the latter when not in use can be brought to a compact condition for placement in a storage space without utilizing excessive space in the storage thereof, for example, may be placed within a tackle box of limited capacity.

A further object of the invention is the provision of a holder of this character, wherein the same is susceptible of a limited range of adjustment so as to clamp and hold fishing poles or rods of different sizes in cross section and will firmly grip the rod or pole without damaging the same at the external surface thereof, the holder being susceptible of mounting within a boat within convenient reach to an occupant or fisherman so that it can be operated with dispatch.

A still further object of the invention is the provision of a holder of this character, which is simple in its construction, thoroughly reliable and efficient in operation, unique in its make-up, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of the holder constructed in accordance with the invention, being applied and in a working position within a boat, only a portion of the latter being shown.

Figure 2 is a front elevation of the holder showing by full lines one position thereof and by dotted lines an adjusted position.

Figure 3 is a sectional view taken on the line 3—3 of Figure 2 looking in the direction of the arrows.

Figure 4 is a perspective view of a release key employed in the holder.

Figure 5 is a side elevation of one part of a releasing handle.

Figure 6 is a view similar to Figure 5 showing another part of said handle.

Similar reference characters indicate corresponding parts throughout the several views in the drawing.

Referring to the drawing in detail, A designates generally the holder constituting the present invention and constructed as hereinafter set forth.

The holder A comprises a double-jaw clamp 10, one jaw being indicated at 11 and the other jaw at 12, respectively. The jaw 12 has threaded therein a binding screw 13 having a cross handle 14, which is slidably fitted with said screw, and this screw has swiveled thereon a gripping head 15 so that the clamp 10 can be securely fastened on a support, a portion of a horizontal support being indicated at 16, and is a seat or timber of a boat construction (not shown).

Rising vertically from the clamp 10 is a stationary upright or stem 17 terminating in a skeleton-like stationary rod or pole grip 18, companion to a movable rod or pole grip 19 of skeleton form united to a swinging leg. stem or shank 20, being pivoted to the stem 17 as and for a purpose hereinafter set forth.

The grips 18 and 19 are angled to the vertical and are adapted to clamp therebetween a fishing pole or rod, a portion of the latter being indicated at 21, so that the said pole or rod can be held for trolling without hand holding of the same. The grips at the engaging faces thereof are preferably serrated at 22 to assure a positive and fast grip upon the pole 21 when clamped by the said grip.

Horizontally fixed for rotation in the stem 17 is the reduced circular threaded portion 23 of a latching arbor having an elongated flat-faced head 24, the latter being accommodated in a correspondingly shaped clearance provided in the stem, shank or leg 20 and in this manner the grip 19 is swingable relative to the grip 18. Fixed to the jaw 11 is a leaf spring 25 playing against the leg, shank or stem 20 for resiliently holding the grip 19 in close relation to the grip 18 and also yieldably allowing the said grip 19 to swing away from the grip 18 or open therefrom.

Releasably arranged on the arbor having the portions 23 and 24 is an operating handle including a handle end 26 proper and side cheeks 27 and 28, respectively, these being formed with pivot ears 29, one having a straight slot 30 and the other a keyhole shaped slot 31 receiving the latching arbor, the rounded portion 23 being accommodated in the slot 30 while the head 24 is accommodated in the slot 31 and when the head 24 is fitted in the narrow portion of the said slot 31, the handle is locked with the stem, shank or leg 20 so that on depressing the handle the grip 19 will be swung away from the grip 18 and the holder opened for releasing the pole or rod 21 therefrom. Now when the head 24 is brought into the wider portion of the slot 31, which is of circular formation, the handle can be swung in close proximity to the stem 17 in that it is released from latched engagement with the said key and in this condition the holder can be readily placed within a storage compartment or space, particularly a tackle box.

From the foregoing taken in connection with the drawing, it should be apparent that the rod or pole 21 will be firmly clamped in the holder and when it is desired to release such rod or pole, it is only necessary for a fisherman or operator to depress the handle of the holder when such handle is latched with the key fixed in the stem, shank or leg 20 and thus the grip 19 moved to open position against the action of the spring 25 freeing the rod from the holder.

The handle end 26 is of a construction to afford a clearance between the cheeks 27 and 28 so that the handle can swing close to the shank 17 when the device is not in use for convenient storage of the holder.

The grips 18 and 19 in their construction are formed with offset webs 32 between the serrated portions 22 so as to avoid contact of these webs with the fishing pole and in this manner eliminating any damaging effect thereon.

What is claimed is:

1. A holder of the kind described comprising correlated fixed and movable stems pivotally connected together, spaced grips on each of said stems, the grips of one stem laterally facing the grips of the other stem, a pivot connecting the stems together and having an elongated flat-faced head anchored in the movable stem, an operating handle provided with cheeks forming pivot ears displaceably connected with the said pivot, one of the pivot ears being provided with a straight slot and the other pivot ear having a key-hole shaped slot receiving the elongated flat-faced head for alternately locking and releasing the said handle therewith, and means active upon the movable stem for exerting tension thereon and normally holding the grips on both stems in close clamping relation to each other.

2. A holder of the kind described comprising correlated fixed and movable stems pivotally connected together, spaced grips on each of said stems, the grips of one stem laterally facing the grips of the other stem, a pivot connecting the stems together and having an elongated flat-faced head anchored in the movable stem, an operating handle provided with cheeks forming pivot ears displaceably connected with the said pivot, one of the pivot ears being provided with a straight slot and the other pivot ear having a key-hole shaped slot receiving the elongated flat-faced head for alternately locking and releasing the said handle therewith, means active upon the movable stem for exerting tension thereon and normally holding the grips on both stems in close clamping relation to each other, and means for fixing the first-mentioned stem to a support.

WALTER T. LEGG.